US012011682B2

(12) United States Patent
Marchand et al.

(10) Patent No.: US 12,011,682 B2
(45) Date of Patent: Jun. 18, 2024

(54) MAGNETIC FILTER CARTRIDGE AND FILTER ASSEMBLY

(71) Applicant: Bay6 Solutions Inc., St. Albert (CA)

(72) Inventors: Roger L Marchand, St. Albert (CA); Douglas J Tschetter, St. Albert (CA); Trevor James Robert Evenson, Parkland County (CA)

(73) Assignee: Bay6 Solutions Inc., St. Albert (CA)

( * ) Notice: Subject to any disclaimer, the term of this patent is extended or adjusted under 35 U.S.C. 154(b) by 135 days.

(21) Appl. No.: 17/673,657

(22) Filed: Feb. 16, 2022

(65) Prior Publication Data

US 2022/0258080 A1 Aug. 18, 2022

Related U.S. Application Data

(60) Provisional application No. 63/150,473, filed on Feb. 17, 2021.

(51) Int. Cl.
*B01D 35/06* (2006.01)
*B01D 27/08* (2006.01)

(52) U.S. Cl.
CPC ............. *B01D 35/06* (2013.01); *B01D 27/08* (2013.01); *B01D 2201/291* (2013.01); *B01D 2201/302* (2013.01)

(58) Field of Classification Search
CPC .. B01D 35/06; B01D 27/08; B01D 2201/291; B01D 2201/302; B03C 2201/18; B03C 2201/28; B03C 1/286
USPC .......... 210/223, 222, 167.29, 282, 314, 338, 210/440–444, 450, 493.2, 455
See application file for complete search history.

(56) References Cited

U.S. PATENT DOCUMENTS

2012/0175312 A1* 7/2012 Martin .................... B03C 1/286
210/695

* cited by examiner

*Primary Examiner* — Madeline Gonzalez
(74) *Attorney, Agent, or Firm* — Finch & Maloney PLLC

(57) ABSTRACT

A magnetic filter cartridge for a filter assembly has an outer surface that extends between a first end and a second end, and an inner surface that defines an inner cavity. A plurality of channels extend between the outer surface and the inner surface. Each channel has a first aperture in the outer surface, a second aperture in the inner surface, and a passage wall that extends between the first aperture and the second aperture. A magnetic element is positioned within the channel between the first aperture and the second aperture and spaced from the passage wall, the magnetic element cooperating with the passage wall to define a circuitous flow path between the first aperture and the second aperture.

23 Claims, 8 Drawing Sheets

MAGNETIC FILTER CARTRIDGE AND FILTER ASSEMBLY

TECHNICAL FIELD

This relates to a filter assembly and a magnetic filter cartridge for filtering magnetic particles from a fluid stream.

BACKGROUND

Filters are often used to clean fluid streams, including hydraulic fluid streams found in industrial equipment. The type of filter used will depend on the type of particles being removed. This may include filters with paper-based media, magnetic filters for removing ferrous particles, or other types of filters. A filter may be installed in various ways, such as in a filter assembly. Filter assemblies are tubular filters that are typically cylindrical in shape, with a replaceable cartridge positioned inside a housing or casing. The inlet and the outlet are typically at the same end of the cartridge filter housing, where the fluid flows radially through the filter cartridge. These filter assemblies are designed to facilitate removal and replacement of a filter cartridge.

SUMMARY

According to an aspect, there is provided a magnetic filter cartridge for a filter assembly. The magnetic filter cartridge comprises a cartridge body having a first end, a second end, an outer surface that extends between the first end to the second end, and an inner surface that defines an inner cavity. A plurality of channels extend between the outer surface and the inner surface. Each channel comprises a first aperture in the outer surface, a second aperture in the inner surface, and a passage wall that extends between the first aperture and the second aperture. Magnetic elements are positioned within the channels between the first aperture and the second aperture and spaced from the passage wall, the magnetic elements cooperating with the passage walls to define circuitous flow paths between the first aperture and the second aperture. A fluid port is in communication with the inner cavity at a first end of the cartridge body.

According to other aspects, the magnetic filter cartridge may comprise one or more of the following features, alone or in combination: the cartridge body may comprise an axis that extends between the first end and the second end, and the plurality of channels extend parallel to the axis; the second end of the cartridge body may be sealed; a width of the second aperture tapers from the second end towards the first end of the cartridge body; a flow area of the first aperture may be greater than a flow area of the second aperture; the magnetic element may be offset in each channel toward the second aperture; a flow area of each channel may progressively reduce toward the second aperture; the outer surface of the cartridge body may comprise planar faces between adjacent second apertures; the plurality of channels and the magnetic elements may be generally cylindrical in shape; the magnetic elements may be carried by a removable cap and are removable from the channels by moving the removable cap relative to the cartridge body; and the cartridge body may comprise a bottom cap adjacent to the second end of the cartridge body, the bottom cap preventing fluid from bypassing the plurality of channels.

According to an aspect, there is provided a filter assembly, comprising a filter head and a housing removably attached to the filter head. The filter head defines a fluid inlet and a fluid outlet within the housing. The housing defines an inner cavity. A magnetic filter cartridge is received within inner cavity of the housing. The magnetic filter cartridge may be as defined above, where the magnetic filter cartridge engages the filter head such that plurality of channels are disposed in a filter flow path from the fluid inlet to the fluid outlet.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
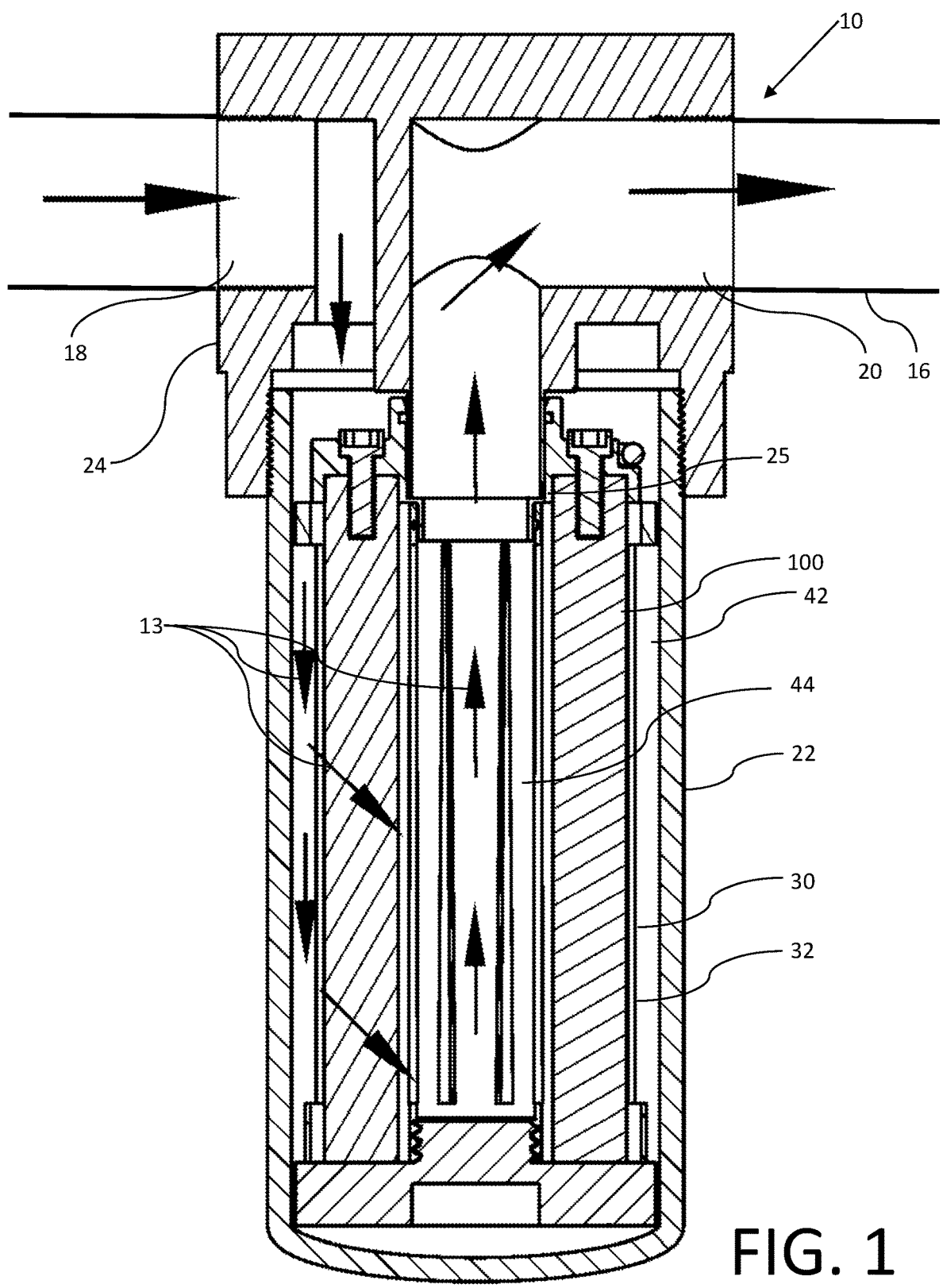
FIG. 1 is a schematic view of a filter assembly.

A filter assembly 10 and magnetic filter cartridge 100 will now be described with reference to FIG. 1 through 8. Magnetic filter cartridge 100 is designed to be a removable and replaceable component in a filter assembly. Referring to FIG. 1, an example of a filter assembly 10 is shown. Magnetic cartridge filter 100 may be designed to be used with an existing filter assembly 10 that is intended to be used with other filter media, such as a paper-based filter, by designing magnetic cartridge filter 100 to have a similar size and shape, and corresponding connections. In this example, magnetic filter cartridge 100 is used to remove ferrous particles from a flow of fluid that passes through filter assembly 10. This may be a hydraulic fluid system used in heavy equipment or machinery, or other fluid system. As used herein, the term "ferrous particles" includes iron-based materials as well as other materials that exhibit ferromagnetic properties, and in particular, that are attracted to a magnet or that are capable of being captured by a magnetic field applied by a magnetic filter.

The depicted example of filter assembly 10 includes a magnetic filter cartridge 100 positioned within a housing or bowl 22. In the depicted example, the magnetic filter cartridge 100 is inserted into housing 22 and attached to a head 24, typically by engaging with a nipple 25. Head 24 is connected to a fluid line 16 by a fluid inlet 18 and a fluid outlet 20. Housing 22 is also attached to head 24 to seal filter assembly 10, and helps define a flow path, depicted by arrows 13. Fluid enters filter assembly 10 through inlet 18, passes into housing 22, through magnetic filter cartridge 100, and exits via outlet port 20. Magnetic filter cartridge 100 may replace a porous (i.e., paper-based) filter in an existing filter assembly 10. Typically, fluid flow passes through magnetic filter cartridge 100 from the outside in. There may be multiple filter assemblies 10 placed in series or in parallel, depending on the demands of the system. Other filter assembly designs are possible. In other examples, filter assembly 10 may be designed to cause fluid to flow in an opposite direction, i.e. from the inside of magnetic filter cartridge 100 to the outside. While magnetic filter cartridge 100 is described herein in terms of a flow direction from the outside in, it will be understood that similar design principles would apply if fluid were to flow in an opposite direction.

Magnetic filter cartridge 100 may be removable so that it may be cleaned, replaced, or otherwise maintained. As shown, magnetic filter cartridge 100 is placed in housing 22, and both interact with head 24 that is connected to fluid line 16 in order to establish a fluid flow path between first fluid port 18 and second fluid port 20 through cartridge 100 within housing 22. The general shape and arrangement of filter assembly 10 depicted in FIG. 1 is a typical filter design for hydraulic fluid systems known to those skilled in the art and may allow filter assembly 10 to be retrofitted into an existing fluid system.

Magnetic filter cartridge 100 has a body 30 with an outer surface 32 that is in fluid communication with inlet 18 and an inner surface 34 that defines a fluid cavity 44 that is in fluid communication with outlet 20. Outer surface 32 is spaced from housing 22 to define an inlet flow space 42 that receives fluid from inlet 18.

Figure 2:
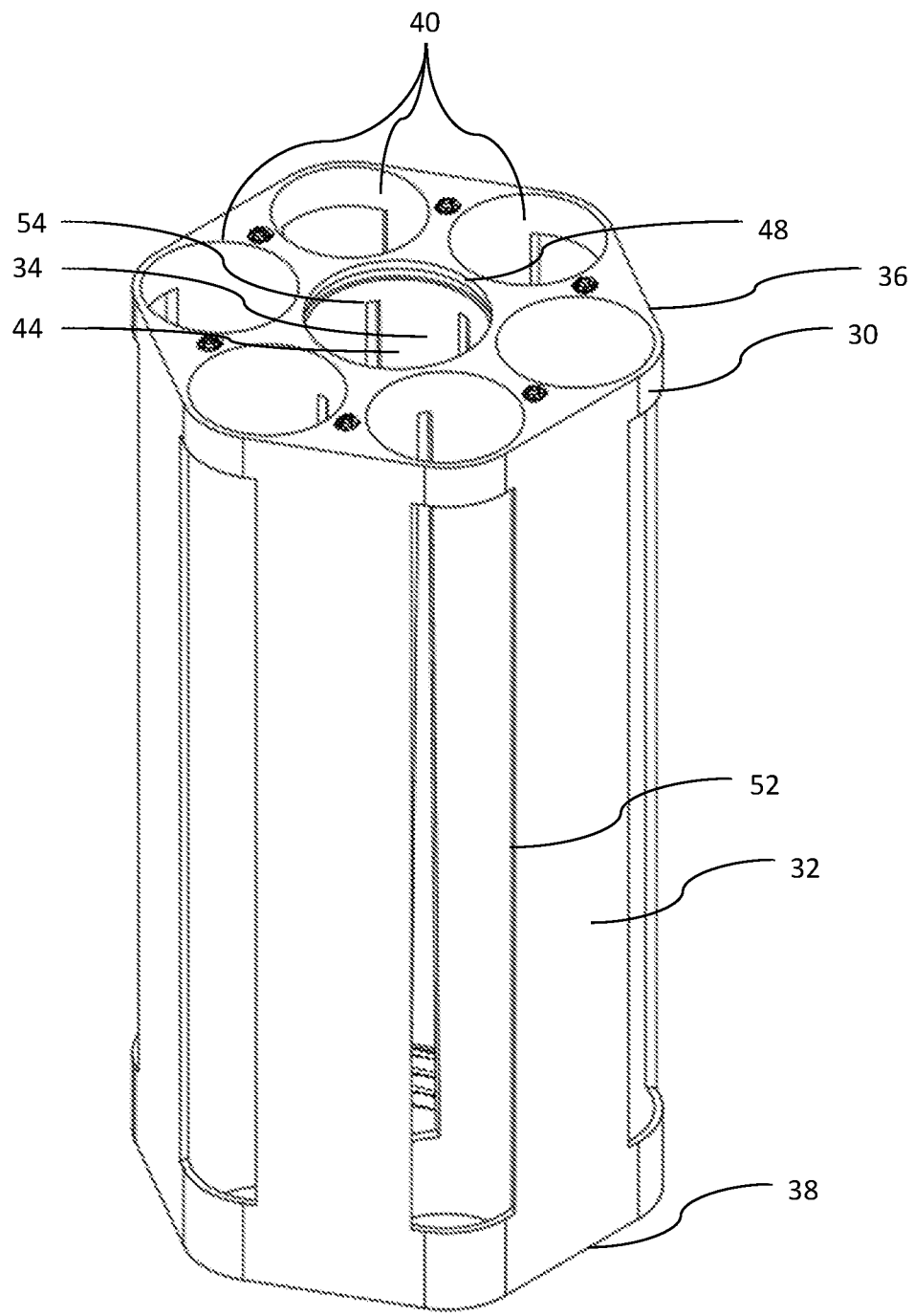
FIG. 2 is a perspective view of a cartridge body.
Figure 3:
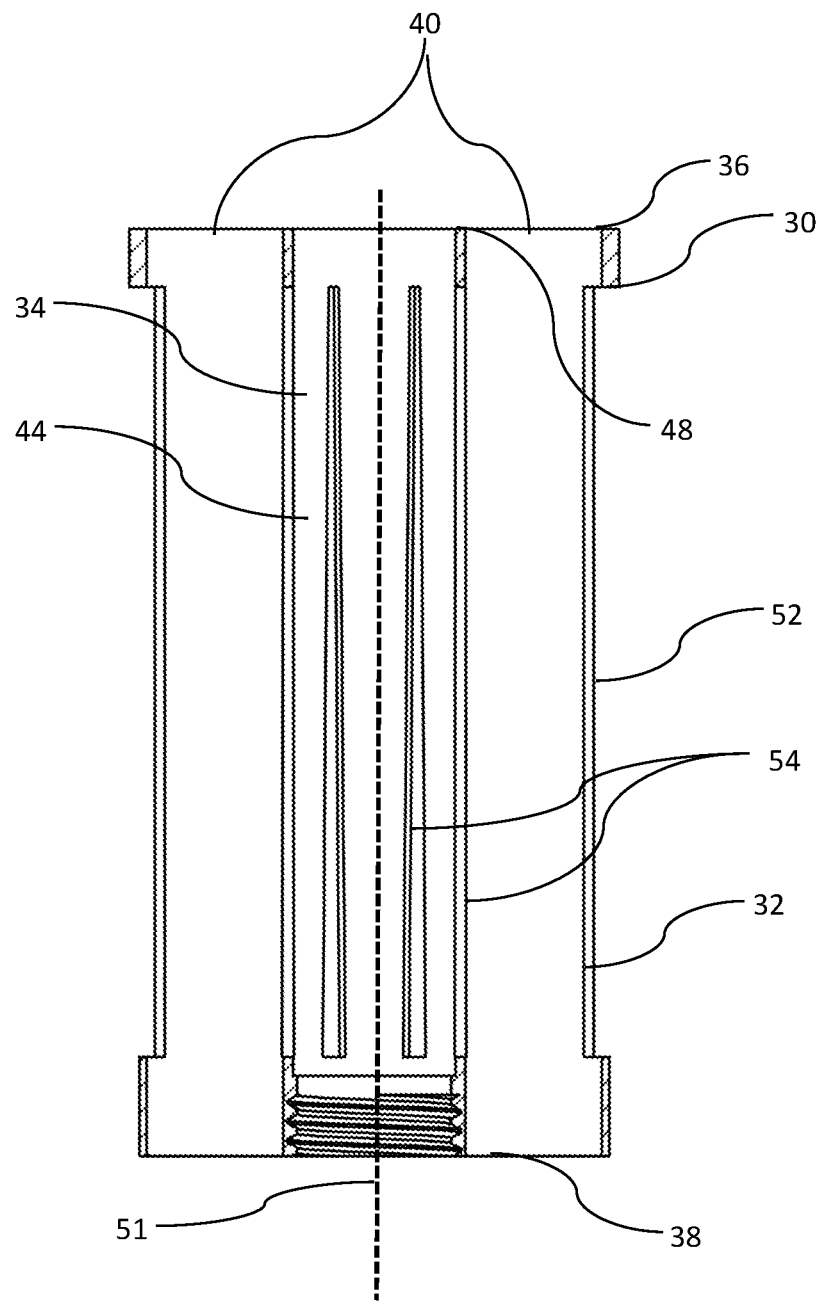
FIG. 3 is a side view in section of a cartridge body.

Referring to FIGS. 2 and 3, body 30 has a plurality of channels 40 distributed about the circumference that extend through body 30.

Figure 4:
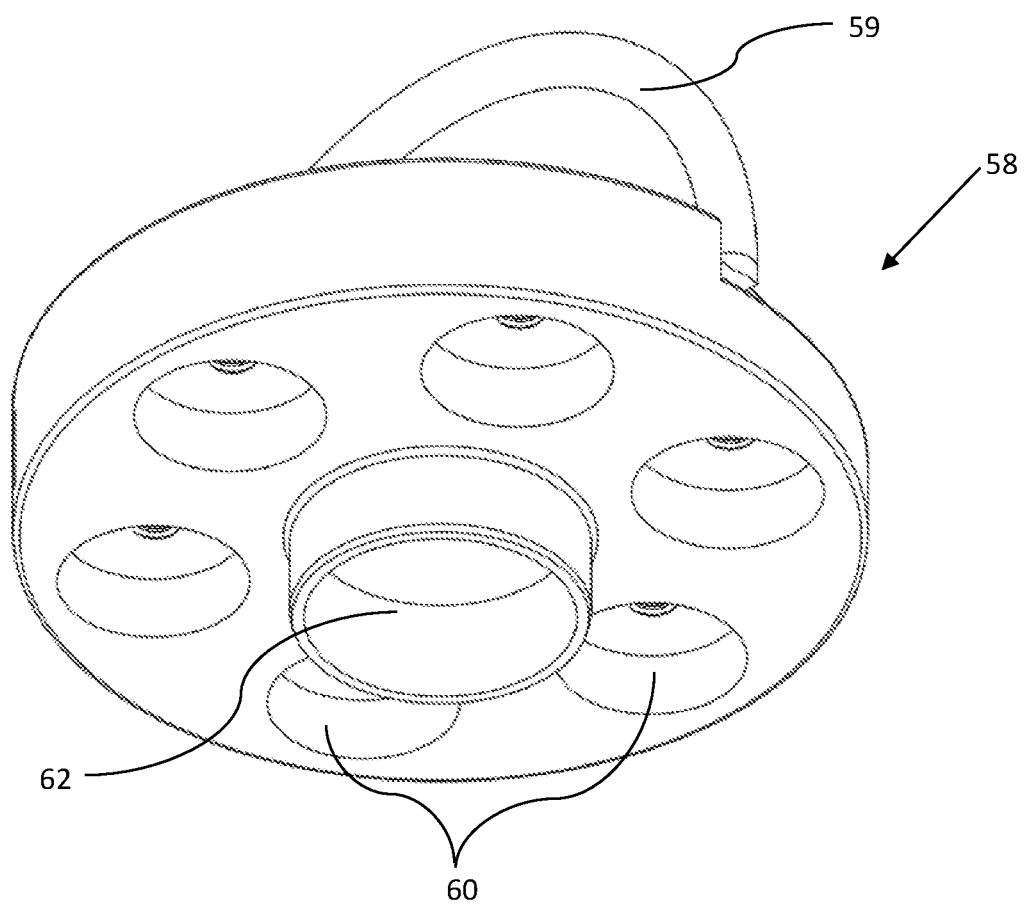
FIG. 4 is a perspective view a top cap for a magnetic filter cartridge.
Figure 5:
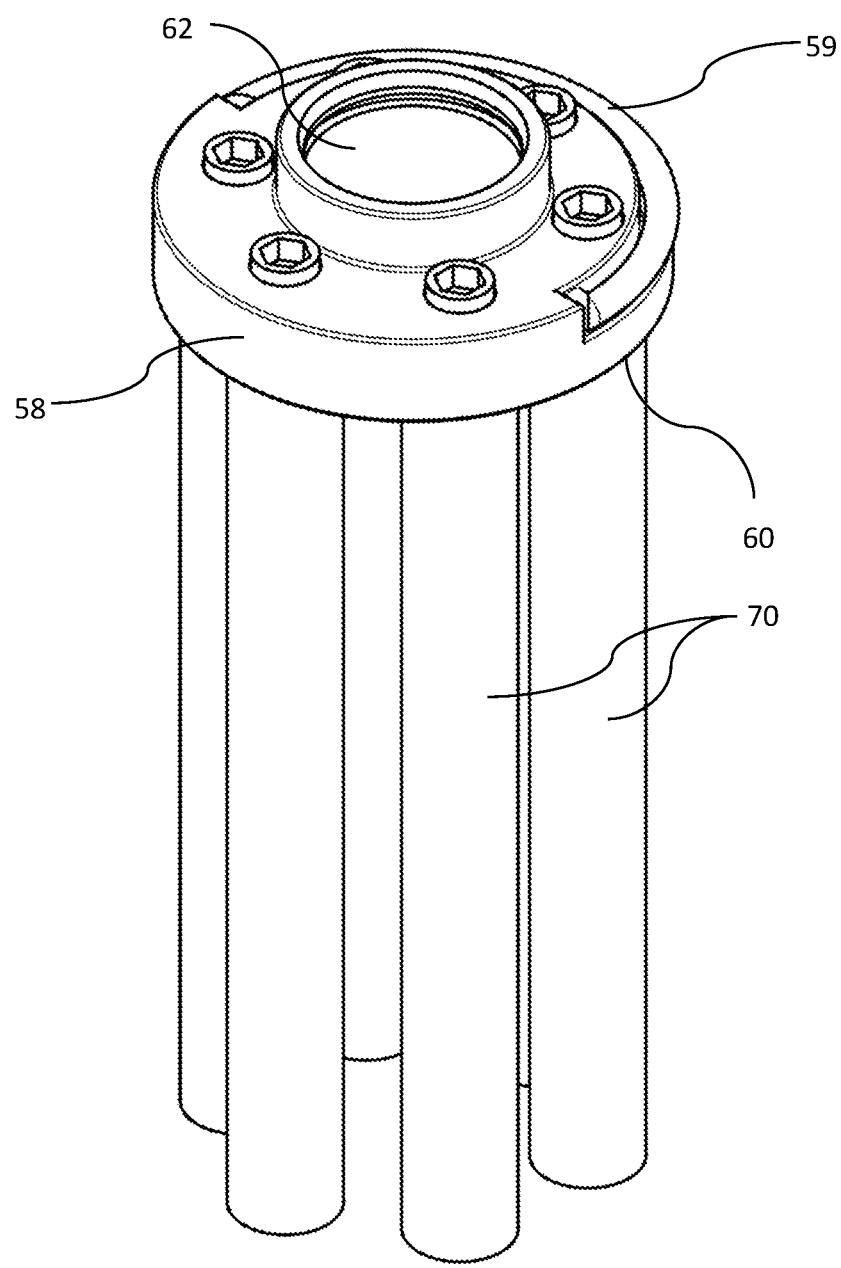
FIG. 5 is a perspective view of a top cap with magnetic elements.

Referring to FIG. 4, a top cap 58 may have a plurality of receptacles 60 to receive magnetic elements 70, shown in FIG. 5. Top cap 58 includes a fluid port 62 that communicates with nipple 25 in head 24 as shown in FIG. 1.

Figure 6:
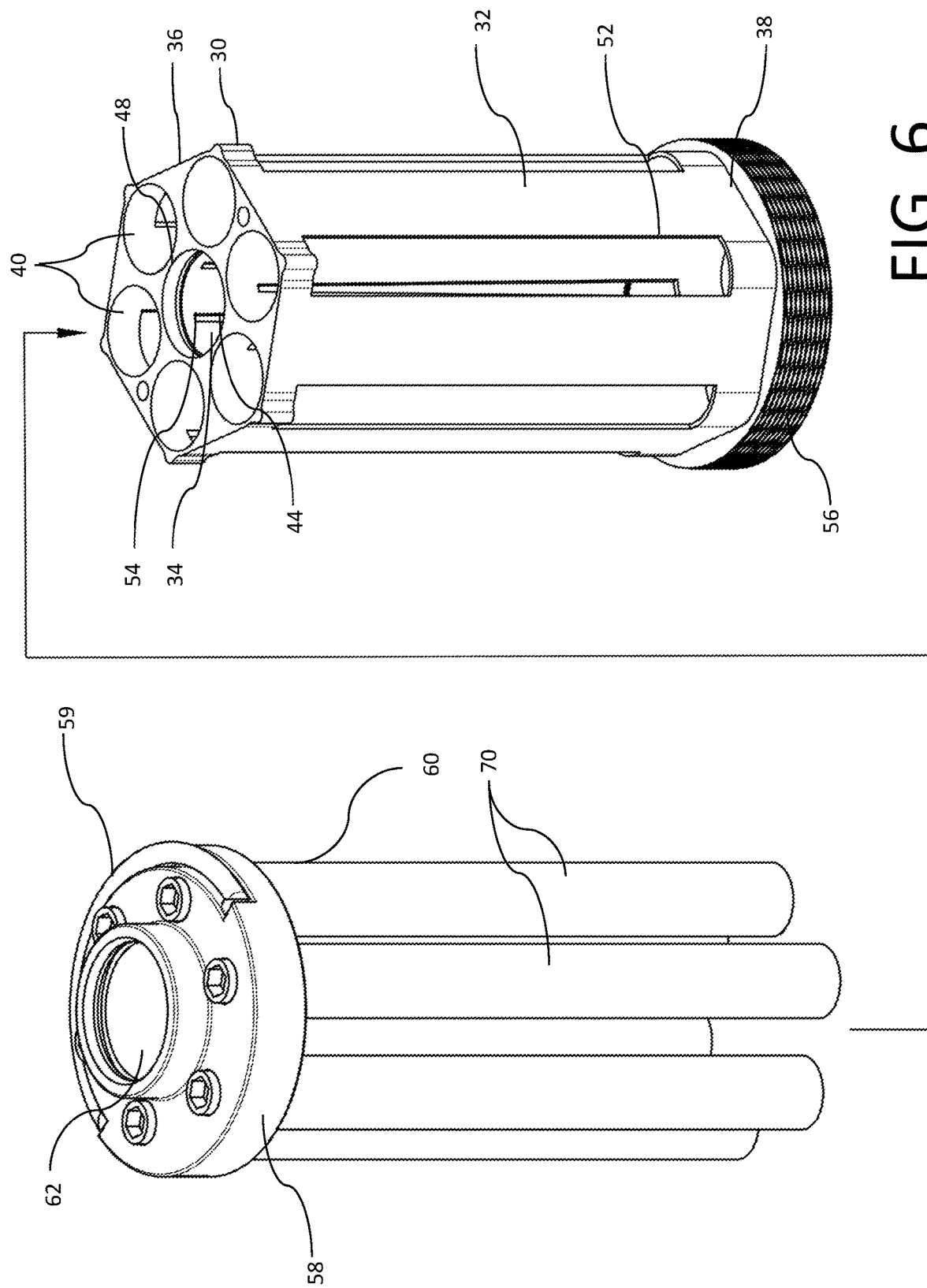
FIG. 6 is an exploded view of a magnetic filter cartridge.

Referring to FIGS. 5 and 6, top cap 58 may carry magnetic elements 70 to facilitate the insertion and removal of magnetic elements from channels 40. Top cap 58 may have a handle 59 to provide a convenient grip when withdrawing or installing magnetic elements 70 in channels 40. Handle 59 may be pivotally mounted to nest against top cap 58 to avoid interfering with the installation of magnetic filter cartridge 100.

Figure 8:
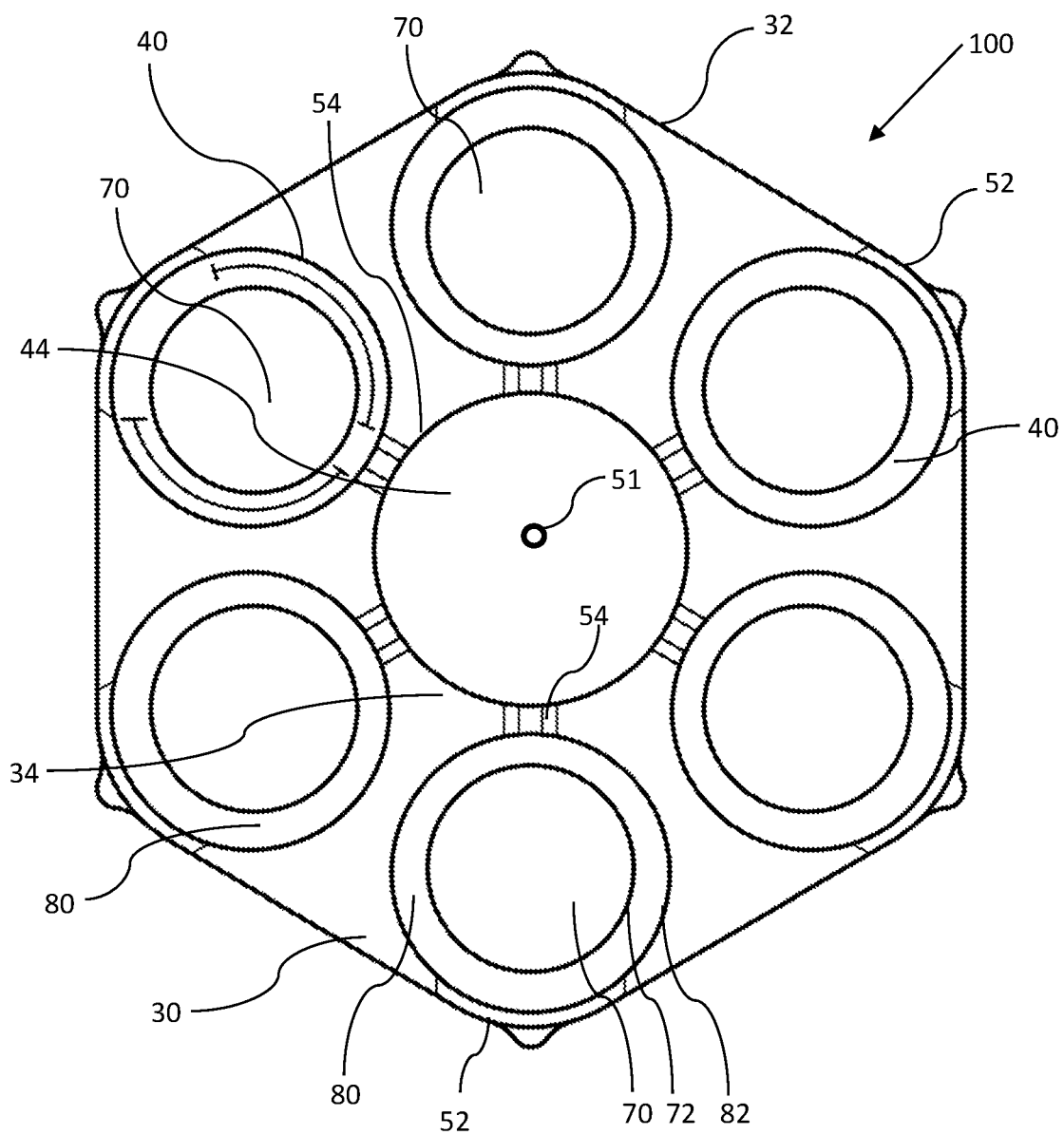
FIG. 8 is a top plan view in section of a magnetic filter cartridge.

Referring to FIG. 5, magnetic filter cartridge 100 is assembled by inserting magnetic elements 70 into channels 40 of body 30 such that fluid port 48 of body 30 is in fluid communication with fluid port 62 of top cap 58 and fluid port 20 when installed in head 24 (shown in FIG. 1) as is common with cartridge type filters, and the bottom of body 30 may be closed by a bottom cap 56 as shown in FIG. 6. Referring to FIGS. 3 and 8, body 30 may have a vertical axis 51 and channels 40 may be distributed around and extend parallel to axis 51. Magnetic filter cartridge 100 may have a degree of symmetry in a generally circular pattern about axis 51 to improve flow distribution.

Figure 7:
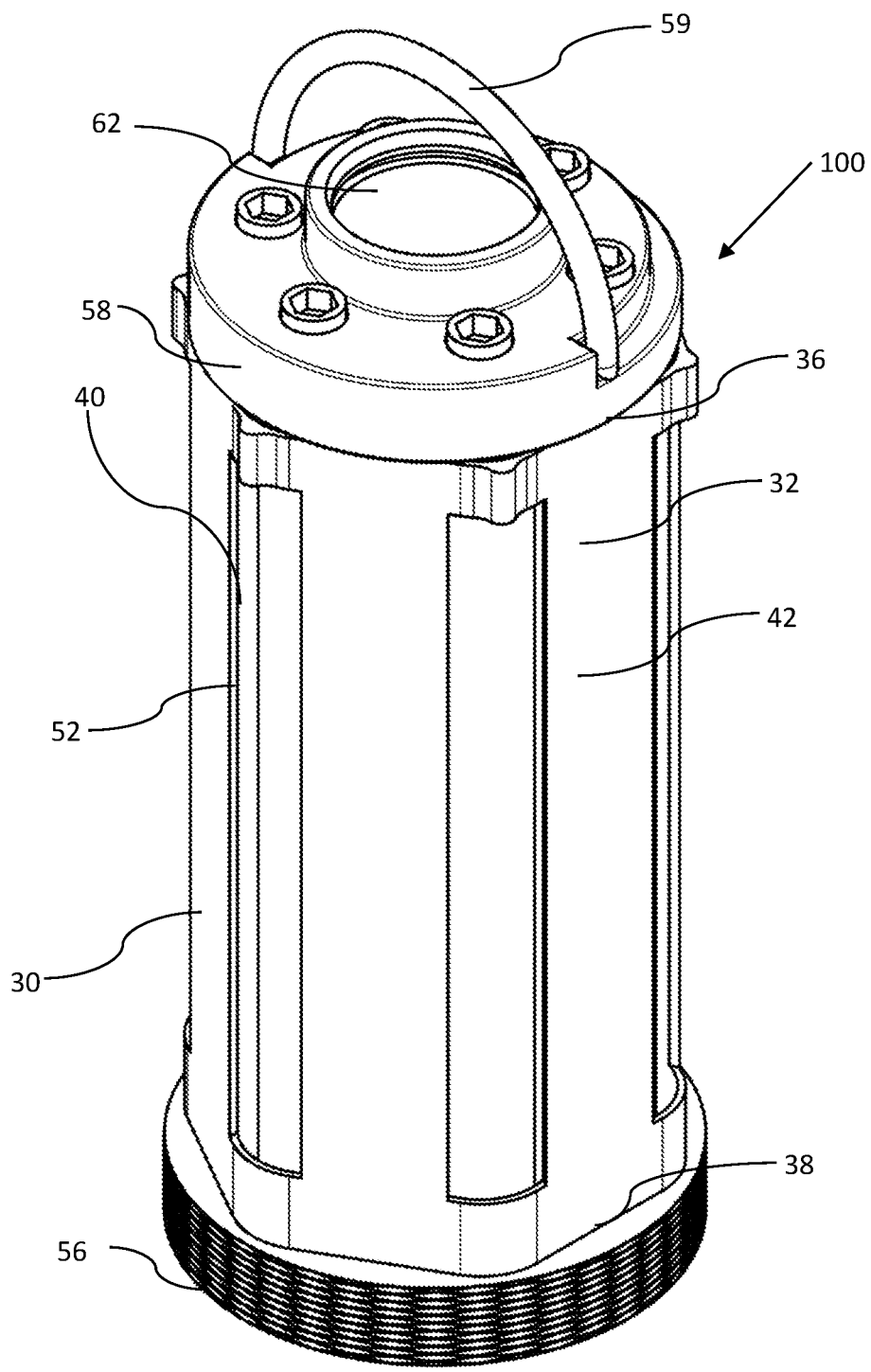
FIG. 7 is a perspective view of a magnetic filter cartridge.

Magnetic filter cartridge 100 as assembled is shown in FIG. 7. One or both of top cap 58 and bottom cap 56 may be removable to facilitate, assembly, cleaning, and servicing of cartridge 100. Referring to FIG. 6, top cap 58 and bottom cap 56 may provide a sufficient restriction to prevent any significant amount of fluid from bypassing channels 40 and may seal against body 30.

Referring to FIG. 8, each channel 40 has a magnetic element 70 positioned between a first aperture 52 in outer surface 32 and a second aperture 54 in inner surface 34 of body 30. The position of element 70 within channel 40 defines a circuitous flow passage 80 within each channel 40. As fluid passes along flow passage 80, magnetic element 70 attracts ferrous particles within the fluid to remove them from the fluid stream. Each magnetic element 70 may be a rod with magnets spaced along its length. In one example, magnetic elements 70 may include disc- or cylindrical-shaped magnets that are stacked end to end and housed in a non-magnetic sheath. Those skilled in the art will be familiar with design options for magnetic rods to optimize the magnetic fields used to capture ferrous particles, and to facilitate maintenance and cleaning of magnetic elements 70. As these details are known in the art, the design of magnetic elements 70 and possible variations will not be described further.

Referring to FIG. 8, a top-down cross section of body 30 with magnetic elements inserted is shown. As can be seen, fluid flows along flow passage 80 between first aperture 52 and second aperture 54. Flow passage 80 is defined by a passage wall 82 and an outer surface 72 of magnetic elements 70 to define a circuitous path along channels 40. Preferably, passage wall 82 is a concave surface and magnetic elements 70 are convex and may be circular in cross-section to minimize flow restriction. The geometry of flow passage 80 may be designed to optimize the removal of magnetic particles from the fluid onto outer surface 72 of magnetic elements 70. Magnetic element 70 may be positioned to redirect flow within passage 80 toward passage wall 82 and around magnetic element 70. Passage wall 82 and outer surface 72 may cooperate to direct fluid flow 13 (shown in FIG. 1) along the outer surface 72 toward second aperture 54. This may be used to increase the time in which fluid resides in a volume around magnetic element 70 in which the magnetic field is sufficiently strong to capture ferrous particles from the fluid. This will depend on the size of the ferrous particles as well as their distance from magnetic element 70. However as magnetic field strength decays quickly at increased distances from magnetic element 70, it is generally preferable to minimize the width of flow passage 80 around magnetic element 70, and increase the length of flow passage 80 and/or slow the fluid flow rate through flow passage 80 to allow more time for ferrous particles to be captured.

In the example shown in FIG. 8, magnetic elements 70 are offset within channels 40 toward second apertures 54. This causes the flow area of flow passage 80 to decrease as passage 80 progresses from first aperture 52 to second aperture 54. This allows larger ferrous particles, which are more strongly attracted to magnetic element 70, to be captured in a larger flow area, thus decreasing the likelihood that they will restrict fluid flow through flow passage 80 while decreasing the distance from magnetic element 70 as the flow approaches second aperture 54 to improve the likelihood that smaller particles will be captured.

In the example depicted in FIG. 8, magnetic element 70 may establish an annular space within channel 40 such that flow passage 80 in each channel is made from two separated arcs of the annular space that start on either side of first aperture 52 and end on the corresponding two sides of second aperture 54. As shown, the annular space may be offset, where the center of the circle defined by passage wall 82 and the center of the circle defined by outer surface 72 are not concentric. The resulting flow passage 80 tapers toward second aperture 54 as a result of this offset. It will be understood that the various features of flow passage 80 described above may be accomplished via a variety of geometries and shapes and is not restricted to those described in the example and depicted in the drawings.

In addition to the position of magnetic element 70, the relative size of apertures 52 and 54 may also affect the flow path, either to cause the fluid to pass closer to magnetic element 70, or to control the speed of fluid flow as it enters and passes along passage 80.

Flow passage 80 may be shaped such that at least 65% of the circumference of channel 40 is confined to within a desired distance from the magnetic element, as represented by lines 81. In other examples, this may be 75% or more of the circumference. In some examples, within the area depicted by lines 81, flow passage 80 may confine the flow to within 4 or 5 mm of the respective magnetic element 70. In other examples, flow passage 80 within the area depicted by lines 81 may confine the flow to within about 25% of the diameter of magnetic element 70 for a cylindrical magnet. In other examples, flow passage 80 within the area depicted by lines 81 may confine the flow such that the magnetic field strength is no less than 65% relative to the surface of magnetic element 70. Flow passage 80 may narrow toward the second aperture as depicted.

Referring to FIG. 3, first and/or second apertures 52 and 54 may be tapered toward first end 36 of body 30 relative to second end 38. As fluid enters housing 22 from first end 36, the taper in apertures 52/54 toward first end 36 encourages more fluid flow toward second end 38 by reducing the flow restriction. This may be used to encourage a more evenly distributed flow rate along the length of body 30. The taper in apertures 52 or 54 may be continuous and linear as shown, or may be curved, stepped, etc. to allow for a larger flow area toward second end 38 relative to first end 36. While apertures 52 and 54 are shown as a continuous opening, it will be understood that one or both may also be a series of vertically spaced, discrete openings in communication with passage 80 rather than a single aperture design. These openings may be differently sized and/or shaped to control flow characteristics, but will typically cooperate to allow liquid to flow through a respective passage 80.

As noted above, magnetic filter cartridge 100 may also be designed to accommodate flow entering inner cavity 44, rather than exiting via inner cavity 44. In that case, modifications to the design shown in FIGS. 3 and 8 may be made. For example, first and second apertures 52 and 54 may be reversed, and the position of magnetic element 70 may be repositioned closer to outer surface 32 within channels 40.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A magnetic filter cartridge for a filter assembly, comprising:
    a cartridge body having a first end, a second end, an outer surface that extends between the first end and the second end, and an inner surface that defines an inner cavity, the inner surface encompassing the inner cavity;
    a plurality of channels extending between the outer surface and the inner surface, each channel comprising:
        a first aperture in the outer surface, a second aperture in the inner surface, and a passage wall that extends between the first aperture and the second aperture, the first aperture being in fluid communication with the inner cavity via the second aperture; and
        a magnetic element within the channel between the first aperture and the second aperture and spaced from the passage wall, the magnetic element cooperating with the passage wall to define a circuitous flow path between the first aperture and the second aperture; and
    a fluid port in communication with the inner cavity at a first end of the cartridge body.

2. The magnetic filter cartridge of claim 1, wherein the cartridge body comprises an axis that extends between the first end and the second end, and the plurality of channels extend parallel to the axis.

3. The magnetic filter cartridge of claim 1, wherein the second end of the cartridge body is sealed.

4. The magnetic filter cartridge of claim 1, wherein a width of the second aperture tapers from the second end towards the first end of the cartridge body.

5. The magnetic filter cartridge of claim 1, wherein a flow area of the first aperture is greater than a flow area of the second aperture.

6. The magnetic filter cartridge of claim 1, wherein the magnetic element is offset in each channel toward the second aperture.

7. The magnetic filter cartridge of claim 1, wherein a flow area of each channel progressively reduces toward the second aperture.

8. The magnetic filter cartridge of claim 1, wherein the outer surface of the cartridge body comprises planar faces between adjacent second apertures.

9. The magnetic filter cartridge of claim 6, wherein the plurality of channels and the magnetic elements are generally cylindrical in shape.

10. The magnetic filter cartridge of claim 1, wherein the magnetic elements are carried by a removable cap and are removable from the channels by moving the removable cap relative to the cartridge body.

11. The magnetic filter cartridge of claim 1, wherein the cartridge body comprises a bottom cap adjacent to the second end of the cartridge body, the bottom cap preventing fluid from bypassing the plurality of channels.

12. A filter assembly, comprising:
    a filter head;
    a housing removably attached to the filter head, the filter head defining a fluid inlet and a fluid outlet within the housing, the housing defining an inner cavity;
    a magnetic filter cartridge received within inner cavity of the housing, the magnetic cartridge comprising:
        a cartridge body having a first end, a second end, an outer surface that extends between the first end to the second end, and an inner surface that defines an inner cavity;
        a plurality of channels extending between the outer surface and the inner surface, each channel comprising:
            a first aperture in the outer surface, a second aperture in the inner surface, and a passage wall that extends between the first aperture and the second aperture; and
            a magnetic element within the channel between the first aperture and the second aperture and spaced from the passage wall, the magnetic element cooperating with the passage wall to define a circuitous flow path between the first aperture and the second aperture; and
    wherein the magnetic filter cartridge engages the filter head such that plurality of channels are disposed in a filter flow path from the fluid inlet to the fluid outlet.

13. The filter assembly of claim 12, wherein the magnetic filter cartridge is removable from the housing.

14. The filter assembly of claim 12, wherein the cartridge body comprises an axis that extends between the first end and the second end, and the plurality of channels extend parallel to the axis.

15. The filter assembly of claim 12, wherein the second end of the cartridge body is sealed.

16. The filter assembly of claim 12, wherein a width of the second aperture tapers from the second end towards the first end of the cartridge body.

17. The filter assembly of claim 12, wherein a flow area of the first aperture is greater than a flow area of the second aperture.

18. The filter assembly of claim 12, wherein the magnetic element is offset in each channel toward the second aperture.

19. The filter assembly of claim 12, wherein a flow area of each channel progressively reduces toward the second aperture.

20. The filter assembly of claim 12, wherein the cartridge body has a cylindrical shape and the plurality of channels surround the inner cavity.

21. The filter assembly of claim 12, wherein the plurality of channels and the magnetic elements are generally cylindrical in shape.

22. The filter assembly of claim 12, wherein the magnetic elements are carried by a removable cap and are removable from the channels by moving the removable cap relative to the cartridge body.

23. The filter assembly of claim 12, wherein the cartridge body comprises a bottom cap adjacent to the second end of the cartridge body, the bottom cap preventing fluid from bypassing the plurality of channels.

\* \* \* \* \*